Patented Oct. 2, 1923.

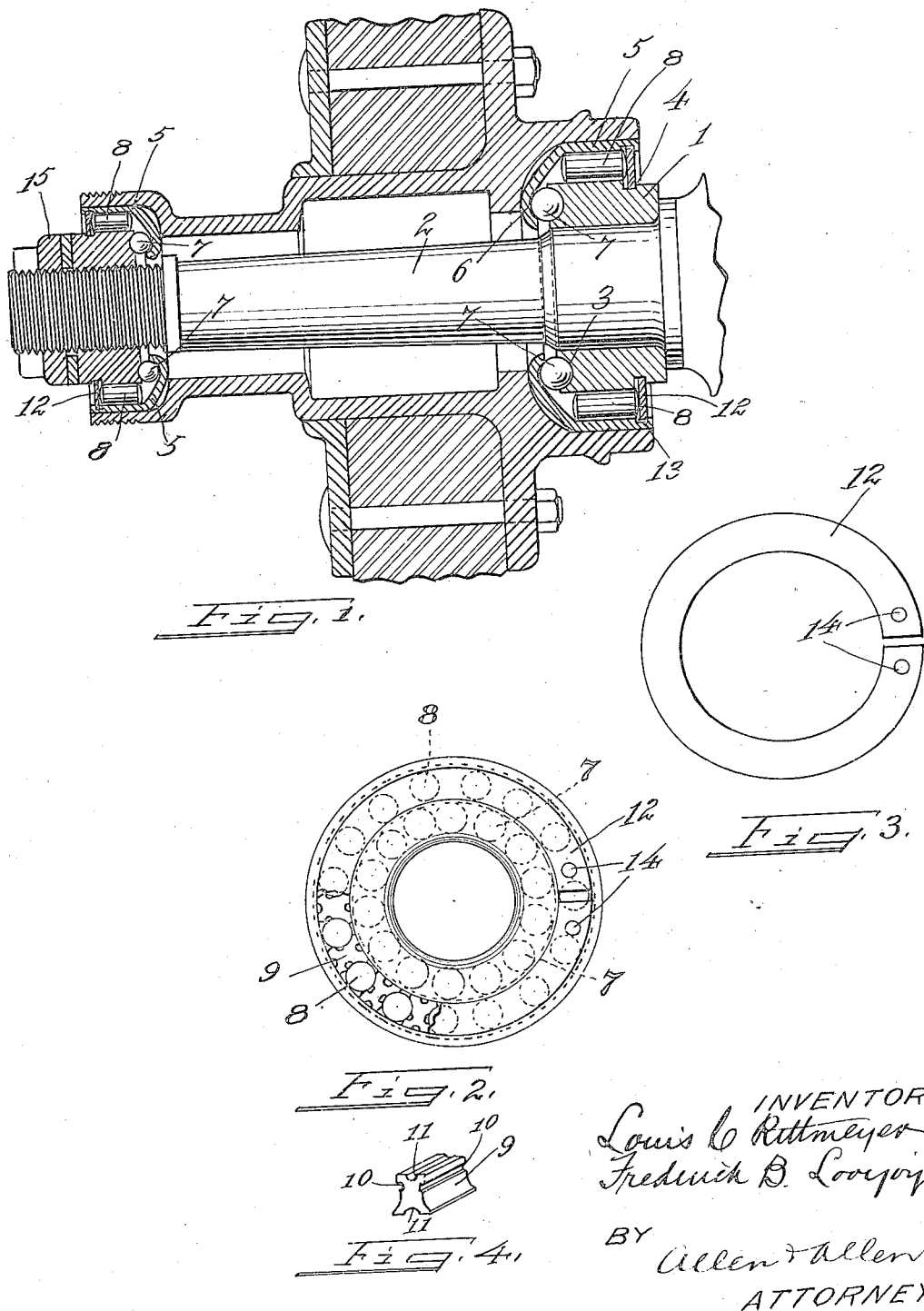

1,469,537

UNITED STATES PATENT OFFICE.

LOUIS C. RITTMEYER AND FREDERICK B. LOVEJOY, OF CINCINNATI, OHIO.

BALL THRUST AND ROLLER BEARING.

Application filed May 6, 1920. Serial No. 379,391.

*To all whom it may concern:*

Be it known that we, LOUIS C. RITTMEYER and FREDERICK B. LOVEJOY, citizens of the United States, and residents of Cincinnati, Hamilton County, Ohio, have invented certain new and useful Improvements in Ball Thrust and Roller Bearings, of which the following is a full, clear, and exact description, reference being had to the drawings forming a part of this specification.

The object of our invention is to provide a simple, cheap and effective composite bearing for side and end strain in which straight rollers shall be employed for the side strains with balls to take up the end thrust and in which the use of any cage for holding the rollers or balls shall be dispensed with. This absence of any cage enables us to very materially reduce the cost of manufacture while simplifying the construction, and, at the same time, the life of the bearings is very largely increased.

In the construction illustrated in the drawings we have shown a bearing especially adapted for the hubs of the wheels in Ford automobiles, although it will be understood that the construction is equally applicable for bearings for all sorts of wheels and for all purposes where side and end strain are to be taken care of.

As simple block spacers are employed to separate the rollers in the event of any damage to one of the rollers or undue wear, it is a very simple and easy matter to renew the ball or roller or spacer without the necessity of breaking open the cage or otherwise damaging the parts of the bearing and hence a very effective construction is provided.

In the drawings,

Figure 1 is a longitudinal section of the hub of a wheel with our improved bearing in place.

Figure 2 is a front elevation of the bearing.

Figure 3 is a front view of the split ring for holding the rollers in place.

Figure 4 is a perspective view of one of the spacing blocks.

The bearing comprises an inner member 1 adapted to make a smooth creeping fit, for example, with the spindle 2 of the axle of an automobile. This inner member is formed with a semi-circular annular groove 3 on its inner face and is provided with a peripheral annular groove 4 at its outer bearing surface.

The outer raceway 5 is preferably formed of pressed steel and is curved inwardly at its inner portion 6 to form a runway for the balls 7, 7, which are interposed between the inner end of the inner member and the curved portion of the outer raceway to form an end thrust ball bearing. Interposed between the straight portions of the inner member and the outer raceway are a series of straight rollers 8, 8, and these rollers are spaced apart by the blocks 9. The blocks are preferably formed with longitudinal grooves 10, 10 and 11, 11 running lengthwise of all four sides of the block for the reception and holding of the lubricant for the rollers. The sides of the block are curved to fit the rollers to present a proper contact surface.

For holding the rollers in place, we provide a flat split ring 12. The inner edge of the raceway 5 is provided with a groove 13 to come opposite the groove 4 in the inner member of the bearing and the ring 12 is formed slightly elliptical so that when the rollers are in place the ring may be passed over the inner member 1 and spring into the two opposing grooves 4 and 13. A pair of holes 14, 14 are preferably provided for the ring 12 so that with some proper instrument the sections of the ring may be drawn together slightly to allow it to enter the grooves.

The hub of the wheel to which the bearing is applied is formed with a socket to receive the outer raceway and the raceway is shaped to fit this socket and thus the raceway forms, as it were, a lining for the socket in the hub into which it is pressed with a tight fit. The raceway is fitted into the socket in the hub before the wheel is placed on the spindle and to assemble the parts of the bearing we proceed as follows. The balls 7, 7 are first placed in the runway and the inner member 1 is then pushed in so that the balls will run in the semi-circular groove 3. The rollers 8, 8, with the spacing blocks 9 are inserted in place and the split ring then sprung into its locking position in the groove and the wheel is then ready to be placed on the spindle.

The bearing for the outer end of the spindle is exactly the same as the inner bearing and we have numbered the various parts the same. Of course, for the outer bearing in order to hold the wheel on the spindle, the usual lock nut 15 is used.

The spacing blocks can be manufactured very cheaply and readily by making use of a long strip of bronze or other suitable material and cutting up the strip in suitable lengths for the purpose. The spacing blocks maintain the rollers in proper spaced relation and most effectually take the place of the cages usually employed to hold the rollers from rolling against each other.

Having thus described our invention, what we claim as new and desire to secure by Letters Patent, is:—

1. In a ball and roller bearing, an outer raceway shaped to fit a socket in the article to be supported, said raceway having an inwardly curved inner portion and an inner bearing member grooved on its inner face with balls seated therein running on said inwardly curved portion of the raceway to take up end thrust and straight rollers interposed between the inner member and the raceway to receive lateral strains with separate, individual and independent spacing elements separating the rollers to maintain them in proper relation to each other.

2. In a ball and roller bearing, an outer raceway shaped to fit a socket in the article to be supported, said raceway having an inwardly curved inner portion and an inner bearing member grooved on its inner face with balls seated therein running on said inwardly curved portion of the raceway to take up end thrust and straight rollers interposed between the inner member and the raceway to receive lateral strains with a loose ring seated in opposing grooves in the bearing members to hold the rollers in place with separate, individual and independent spacing elements separating the rollers to maintain the said rollers in proper relation to each other.

3. In a ball and roller bearing, an outer raceway shaped to fit a socket in the article to be supported, said raceway having an inwardly curved inner portion and an inner bearing member grooved on its inner face with balls seated therein running on said inwardly curved portion of the raceway to take up end thrust and straight rollers interposed between the inner member and the raceway to receive lateral strains and individual spacing blocks loosely interposed between the rollers to maintain them in proper relation to each other.

4. In a ball and roller bearing, an outer raceway shaped to fit a socket in the article to be supported, said raceway having an inwardly curved inner portion and an inner bearing member grooved on its inner face with balls seated therein running on said inwardy curved portion of the raceway to take up end thrust and straight rollers interposed between the inner member and the raceway to receive lateral strains and individual spacing blocks loosely interposed between the rollers to maintain them in proper relation to each other, the spacing blocks provided with grooves for the retention of suitable lubricant.

5. In a roller bearing the combination with raceway members, of a series of antifriction rolling elements set between said raceway members, and separate, independent loose blocks set between the rollers as spacers therefor, said blocks being solid and having grooved faces to carry lubricant, and shaped to conform to the rolling elements at points of contact therewith.

LOUIS C. RITTMEYER.
FREDERICK B. LOVEJOY.